(12) United States Patent
Kwon et al.

(10) Patent No.: US 11,184,054 B2
(45) Date of Patent: Nov. 23, 2021

(54) DISTRIBUTED ANTENNA SYSTEM USING RECONFIGURABLE FRAME STRUCTURE AND METHOD OF OPERATION THEREOF

(71) Applicant: SOLiD, INC., Seongnam-si (KR)

(72) Inventors: Dong Hee Kwon, Yongin-si (KR); Hoo Pyo Hong, Seongnam-si (KR)

(73) Assignee: SOLiD, INC., Seongnam-si (KR)

( * ) Notice: Subject to any disclaimer, the term of this patent is extended or adjusted under 35 U.S.C. 154(b) by 0 days.

(21) Appl. No.: 16/638,547

(22) PCT Filed: May 27, 2019

(86) PCT No.: PCT/KR2019/006345
§ 371 (c)(1),
(2) Date: Feb. 12, 2020

(87) PCT Pub. No.: WO2019/226032
PCT Pub. Date: Nov. 28, 2019

(65) Prior Publication Data
US 2020/0220580 A1 Jul. 9, 2020

(30) Foreign Application Priority Data
May 25, 2018 (KR) .......................... 10-2018-0059641

(51) Int. Cl.
*H04B 7/04* (2017.01)
*H04B 1/40* (2015.01)
*H04L 27/00* (2006.01)

(52) U.S. Cl.
CPC .................. *H04B 7/04* (2013.01); *H04B 1/40* (2013.01); *H04L 27/0002* (2013.01)

(58) Field of Classification Search
CPC ......... H04B 7/04; H04B 1/40; H04L 27/0002; H04L 1/00; H04L 45/64; H04L 45/66; H04L 1/0083; H04L 2212/00
See application file for complete search history.

(56) References Cited

U.S. PATENT DOCUMENTS

| 8,270,387 B2 | 9/2012 | Cannon et al. | |
| 2010/0278530 A1* | 11/2010 | Kummetz | H04W 88/085 398/41 |
| 2012/0057572 A1* | 3/2012 | Evans | H04W 88/085 370/338 |

(Continued)

FOREIGN PATENT DOCUMENTS

| EP | 1 858 276 A1 | 11/2007 |
| KR | 10-2011-0108362 A | 10/2011 |
| WO | 2015/160380 A1 | 10/2015 |

OTHER PUBLICATIONS

International Search Report of PCT/KR2019/006345 dated Sep. 27, 2019 [PCT/ISA/210].

(Continued)

*Primary Examiner* — Vineeta S Panwalkar
(74) *Attorney, Agent, or Firm* — Sughrue Mion, PLLC

(57) ABSTRACT

According to an aspect of the present disclosure, a method of processing a data stream in a node unit included in a distributed antenna system includes: receiving frame layout information; changing a frame layout of a predetermined transmission frame based on the received frame layout information; and framing a plurality of data streams based on the changed frame layout.

15 Claims, 12 Drawing Sheets

(56) References Cited

U.S. PATENT DOCUMENTS

2019/0280795 A1* 9/2019 Kuipers ............... H04J 3/1694

OTHER PUBLICATIONS

NGMN Alliance, NGMN Overview on 5G RAN Functional Decomposition, v. 1.0, Feb. 24, 2018, 2018 Next Generation Mobile Networks Ltd.
Extended Search Report issued in the European Patent Office dated Mar. 9, 2021 in corresponding European Patent Application No. 19806826.4-1216 / 3654561.

* cited by examiner

DISTRIBUTED ANTENNA SYSTEM USING RECONFIGURABLE FRAME STRUCTURE AND METHOD OF OPERATION THEREOF

CROSS-REFERENCE TO RELATED APPLICATION

This application is a National Stage of PCT International Application No. PCT/KR2019/006345, filed May 27, 2019, and claims priority from Korean Patent Application No. 10-2018-0059641, filed May 25, 2018, the contents of which are incorporated herein by reference in their entireties.

BACKGROUND

1. Field

The present disclosure relates to a distributed antenna system and a method of operating the same, and more particularly, to a distributed antenna system using a reconfigurable frame structure and a method of operating the same.

2. Description of the Related Art

A distributed antenna system is a system composed of common nodes (e.g., headend units) and antenna nodes (e.g., remote units) that are connected to the common nodes through a transmission medium or a transmission network and are spatially separated.

Radio signals are transmitted between the common nodes and the antenna nodes of the distributed antenna system. Through this, at least one service provider device connected in a communicative manner with the headend units of the distributed antenna system may provide cellular service, Internet service, etc. to subscriber devices in a service area of the distributed antenna system.

The distributed antenna system is generally implemented in neutral host architecture for integrating and providing various wireless services. As a result, the distributed antenna system operates by statically allocating transmission resources (e.g., a transmission medium bandwidth) required for radio signal transmission between nodes of the distributed antenna system on the premise that all wireless services are supported, hardware resources, and the like.

However, in the actual operating environment of the distributed antenna system, many wireless services are not provided in many cases, so that static resource allocation and operation methods of the distributed antenna system are inefficient.

SUMMARY

Provided are a distributed antenna system using a reconfigurable frame structure to efficiently use limited resources and a method of operating the distributed antenna system.

The inventive concept of the present disclosure is not limited to the above objective(s), but other objective(s) not described herein may be clearly understood by one of ordinary skilled in the art from descriptions below.

According to an aspect of the present disclosure, there is provided a method of processing a data stream in a node unit included in a distributed antenna system, the method includes: receiving frame layout information; changing a frame layout of a predetermined transmission frame based on the received frame layout information; and framing a plurality of data streams based on the changed frame layout.

According to an exemplary embodiment, the frame layout information may be obtained by changing a predetermined mapping position of the plurality of data streams such that the plurality of data streams are mapped to contiguous resource blocks in a data field of the transmission frame.

According to an exemplary embodiment, the contiguous resource blocks may be contiguous in a time domain.

According to an exemplary embodiment, resource blocks to which the plurality of data streams are not mapped may not be interposed between the contiguous resource blocks.

According to an exemplary embodiment, the frame layout information may include frame layout information about each of transmission periods, and the changing of the frame layout may include: changing the frame layout of the predetermined transmission frame with respect to a transmission period associated with the node unit among the transmission periods.

According to an exemplary embodiment, the frame layout information may include frame layout information about each of downlink path and uplink path, and the changing of the frame layout may include: changing the frame layout of the predetermined transmission frame for each of the downlink path and the uplink path.

According to an exemplary embodiment, the receiving of the frame layout information may include: receiving the frame layout information from a system controller of the distributed antenna system or another node unit communicatively coupled to the node unit.

According to another aspect of the present disclosure, there is provided a frame processing logic circuit included in a node unit of a distributed antenna system, the frame processing logic circuit includes: a memory storing one or more instructions; and a processor executing the one or more instructions stored in the memory, wherein the processor, by executing the one or more instructions, is configured to: change a frame layout of a predetermined transmission frame based on received frame layout information, and frame a plurality of data streams based on the changed frame layout.

According to an exemplary embodiment, the frame layout information may be obtained by changing a predetermined mapping position of the plurality of data streams such that the plurality of data streams are mapped to contiguous resource blocks in a data field of the transmission frame.

According to an exemplary embodiment, the contiguous resource blocks may be contiguous in a time domain.

According to an exemplary embodiment, resource blocks to which the plurality of data streams are not mapped may not be interposed between the contiguous resource blocks.

According to an exemplary embodiment, the frame layout information may include frame layout information about each of transmission periods, and the processor, by executing the one or more instructions, may be configured to: change the frame layout of the predetermined transmission frame with respect to a transmission period associated with the node unit among the transmission periods.

According to an exemplary embodiment, the frame layout information may include: frame layout information about each of downlink path and uplink path, and the processor, by executing the one or more instructions, may be configured to: change the frame layout of the predetermined transmission frame for each of the downlink path and the uplink path.

According to an exemplary embodiment, the frame layout information may be received from a system controller of the distributed antenna system or another node unit communicatively coupled to the node unit.

According to an exemplary embodiment, the node unit may be any one of a headend unit, an expansion unit, and a remote unit.

According to embodiments of the present disclosure, a frame structure for data transmission between nodes may be reconfigured in consideration of needs of a service provider, needs of a user, and the operating environment of a distributed antenna system.

Accordingly, the present disclosure has the effect of efficiently using transmission resources and the like of the distributed antenna system.

In addition, the present disclosure has the effect of improving the quality of service while reducing power consumption.

In addition, the present disclosure may facilitate integrated support of Ethernet backhaul services such as small cells and Wi-Fi.

Effects obtainable by the distributed antenna system and a method of operating the same according to the inventive concept of the present disclosure are not limited to the effect(s) described above, but other effect(s) not described herein may be clearly understood by one of ordinary skill in the art from the above descriptions.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Various embodiments and features according to the inventive concept of the present disclosure will be further described later below. It should be apparent that the teachings herein may be implemented in a wide variety of forms and any particular structure, function, or both, disclosed herein are merely exemplary, and not limiting. Based on the teachings herein, those of ordinary skill in the art will appreciate that aspects disclosed herein may be implemented independently of any other aspects, and two or more of these aspects may be combined in various ways. For example, a device or a method may be implemented by using any number of aspects set forth herein. Furthermore, the device or the method may be implemented with structures and functions of one or more of the aspects described herein, or may be implemented by using structures and functions of other aspects. For example, the method may be implemented as a part of instructions stored on a non-transitory computer-readable recording medium for execution on a system, a device, an apparatus and/or a processor, or a computer. Furthermore, one aspect may include at least one component of the claim.

Hereinafter, various embodiments of the present disclosure will be described in detail in order.

Figure 1:
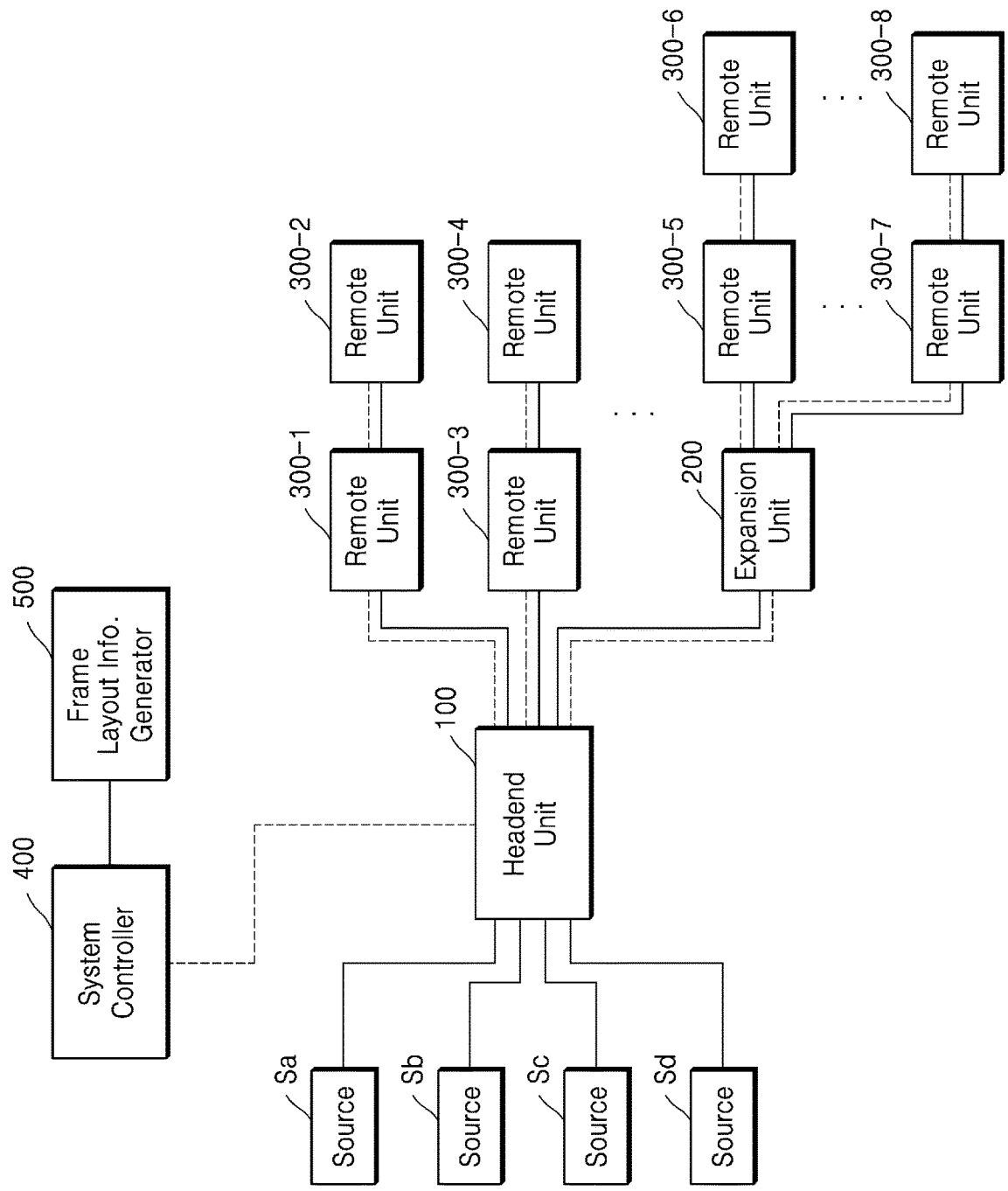
FIG. 1 is a conceptual block diagram of a distributed antenna system according to an embodiment.

FIG. 1 is a conceptual block diagram of a distributed antenna system according to an embodiment.

Referring to FIG. 1, a distributed antenna system (DAS) 10 may include a headend unit 100, an expansion unit 200, a plurality of remote units 300-1 to 300-8, a system controller 400, and a frame layout information generator 500.

The headend unit 100 may be communicatively coupled to a plurality of sources Sa to Sd in a wired or wireless manner. The headend unit 100 may receive various radio signals from the plurality of sources Sa to Sd.

For example, one or more of the plurality of sources Sa to Sd may be a base station device providing a radio frequency (RF) signal.

For another example, any one of the sources Sa to Sd may be a base station device for providing a digitized RF signal. The digitized RF signal may include a data packet formatted according to a standardized telecommunication protocol. Non-limiting examples of the standardized telecommunication protocol may include a common public radio interface (CPRI), an Ethernet-based common public radio interface (eCRPI), an open radio equipment interface (ORI), or an open base station architecture initiative (OBSAI) protocol.

For another example, any one of the plurality of sources Sa to Sd may be an IP backhaul device for a small cell and a Wi-Fi backhaul service. The IP backhaul device may be an Internet gateway, a VPN gateway, or the like.

Hereinafter, for convenience of description, it is assumed that the sources Sa and Sb are base station devices for providing an RF signal, the source Sc is a base station device for providing a digitized RF signal, and the source Sd is an IP backhaul device.

Meanwhile, although not shown in FIG. 1, a point of interface (POI) may be disposed between the sources Sa and Sb for providing the RF signal and the headend unit 100. The POI may be a device for matching between the sources Sa and Sb and the headend unit 100. The POI may adjust a high power level RF signal received from the sources Sa and Sb to a level suitable for the headend unit 100, and may adjust an RF signal received from the headend unit 100 to a level suitable for the sources Sa and Sb.

The headend unit 100 may perform a predetermined processing on various radio signals received. For example, the headend unit 100 may digitally convert an RF signal, and perform resampling or the like on the digitized RF signal. The headend unit 100 may generate downlink transmission frames by framing data streams and Ethernet data generated as a result of the processing. Signal processing in a downlink path of the headend unit 100 will be described in more detail with reference to FIG. 3 below.

The headend unit 100 may distribute the downlink transmission frames to the expansion unit 200 and the remote units 300-1 to 300-8. In more detail, the headend unit 200 may transmit the downlink transmission frames to the remote units 300-5 to 300-8 through the expansion unit 200, and may further transmit the downlink transmission frames to the remote units 300-1 to 300-4.

The headend unit 100 may deframe uplink transmission frames received from the expansion unit 200 and the remote units 300-1 to 300-8, process data streams according to a corresponding one of the sources Sa to Sd, and transmit the data streams to a corresponding source. Signal processing in the uplink path of the headend unit 100 will also be described in more detail with reference to FIG. 3 below.

Although not shown in FIG. 1, the headend unit 100 may be connected to other headend units and may transmit and receive the downlink transmission frames and the uplink transmission frames with other headend units.

The headend unit 100 may distribute or redistribute the capacity for a communication service. Here, the capacity may mean the capacity for each service. Also, the headend unit 100 may distribute or redistribute the capacity for each service. Here, the service may mean a carrier, frequency band, sector, service for each provider.

The expansion unit 200 may be communicatively coupled to the headend unit 100 and the remote units 300-5 to 300-8 and may expand the connection capacity of the headend unit 200.

The expansion unit 200 may transmit the downlink transmission frames and the uplink transmission frames between the connected headend unit 100 and the remote units 300-5 to 300-8. Signal processing in a downlink path and an uplink path of the expansion unit 200 will be described in more detail with reference to FIG. 6 below.

The expansion unit 200 may convert the format of a transmitted signal in a signal transmission process. For example, the expansion unit 200 may convert a digital signal received from the headend unit 100 into an Ethernet format and may transmit data converted into the Ethernet format to the remote units 300-5 to 300-8. The expansion unit 200 may convert an Ethernet format signal received from the remote units 300-5 to 300-8 into a digital signal and transmit the digital signal to the headend unit 100.

The expansion unit 200 may supply power to the remote units 300-5 to 300-8. For example, the expansion unit 200 may supply power to the connected remote units 300-5 to 300-8 through power of Ethernet (PoE).

The expansion unit 200 may monitor a current for each of the remote units 300-5 to 300-8, and may automatically turn off the power according to the monitoring.

The remote units 300-1 to 300-4 may be communicatively coupled to the headend unit 100, and the remote units 300-5 to 300-8 may be communicatively coupled to the headend unit 100 through the expansion unit 200.

The remote units 300-1 to 300-8 may deframe downlink transmission frames received from the headend unit 100 and the expansion unit 200 to generate data streams, and may restore the generated data streams to the original signals (e.g., an RF signal, a digitized RF signal, or Ethernet data). The remote units 300-1 to 300-8 may output the restored signals in the form required by a service subscriber device or the like located in the coverage.

The remote units 300-1 to 300-8 may perform certain processing on various radio signals received from the service subscriber device or the like located in the service coverage to generate an uplink transmission frame, and may transmit the uplink transmission frame to the headend unit 100 and the expansion unit 200.

Signal processing in a downlink path and an uplink path of the remote units 300-1 to 300-8 will be described in more detail with reference to FIG. 7 below.

The remote units 300-1 to 300-8 may be divided into high power and low power according to an output.

Among the remote units 300-1 to 300-8, a remote unit having a low power output may be referred to as a low power radio node, and a remote unit having a high power output may be referred to as a high power radio node.

The remote units 300-1 to 300-8 may include an integrated antenna and may be connected to an external antenna through an external antenna port.

In addition, the remote units 300-1 to 300-8 may include or be connected to a plurality of directional antennas so as to transmit a signal to a specific area or a specific sector or receive a signal from a specific area or a specific sector. For example, the remote units 300-1 to 300-8 may include at least one sector antenna or may be connected to the sector antenna. In addition, the remote units 300-1 to 300-8 may include or be connected to an omnidirectional antenna and a directional antenna. The remote units 300-1 to 300-8 may selectively operate only some of integrated antennas and external antennas.

Another remote unit, for example, an add-on remote unit, may be connected to at least some of the remote units 300-1 to 300-8. This is to expand the capacity of the remote units 300-1 to 300-8 and may be selectively applied in multi input multi output (MIMO) service environment conditions.

The headend unit 100, the expansion unit 200, and the remote units 300-1 to 300-8 may be connected to each other through various transmission media. For example, the transmission medium may include an optical fiber, a coaxial cable, an Ethernet cable, or the like.

The headend unit 100, the expansion unit 200, and the remote units 300-1 to 300-8 may be connected to each other in various topologies.

For example, as shown in FIG. 1, the headend unit 100 may be connected to the expansion unit 200 and the remote units 300-1 and 300-3 in a star structure. The expansion unit 200 may be connected to the remote units 300-5 and 300-7 in a star structure. The remote units 300-1 and 300-2, the remote units 300-3 and 300-4, the remote units 300-5 and 300-6, and the remote units 300-7 and 300-8 may be connected to each other in a cascade structure.

However, the present disclosure is not limited thereto, and the headend unit 100, the expansion unit 200, and the remote units 300-1 to 300-8 may be connected to each other in various topologies such as a ring and a mesh, in addition to the above-described star and cascade structures. In addition, the number of the headend unit 100, the expansion unit 200, and the remote units 300-1 to 300-8 may also be changed.

The headend unit 100, the expansion unit 200, and the remote units 300-1 to 300-8 may be implemented to support at least one of a frequency division duplex scheme and a time division duplex scheme.

A signal processing method between the headend unit 100, the expansion unit 200, and the remote units 300-1 to 300-8 may be variously configured according to a designer's or user's selection.

Therefore, in the above-described embodiments, an analog processing method may be applied between some units in addition to a method of digitally processing and transmitting signals between each unit.

The system controller 400 may control and manage the DAS 10. For example, the system controller 400 may monitor and control the status and operation of the headend unit 100, the expansion unit 200, and the remote units 300-1 to 300-8 included in the DAS 10. The system controller 400 may be referred to as a network management system (NMS).

The system controller 400 may control procedures related to pseudo-dynamic changes to the structure of a transmission frame used for digital transmission of radio signals between nodes of the DAS 10.

For example, the system controller 400 may control a frame layout change operation of the headend unit 100, the expansion unit 200, and the remote units 300-1 to 300-8, as well as a handshaking operation for initiating a frame layout change.

In more detail, the system controller 400 exchanges protocol messages for starting the frame layout change with the headend unit 100, and with the expansion unit 200 and the remote units 300-1 to 300-8 through the head end unit 100. Through this, the DAS 10 may determine in advance whether a problem occurs on the service due to a frame layout change procedure, and the frame layout change procedure may be performed in a range that does not interfere with the service. The system controller 400 may use a Control & Management (C&M) channel when transmitting and receiving the messages.

When it is confirmed that preparation of the frame layout change is completed, the system controller 400 may transmit frame layout information received from the frame layout information generator 500 to the DAS 10. The system controller 400 may also transmit the frame layout information to the headend unit 100 using the C&M channel. According to an embodiment, the frame layout information may also be transmitted from the system controller 400 to units of the DAS 10 in the above-described handshaking operation.

The units of the DAS 10 may change a predetermined frame layout based on the received frame layout information. The units of the DAS 10 frame data streams based on the changed frame layout.

In the above, the frame layout change procedure by the system controller 400 has been described as an example, but an initial setting procedure of a frame structure by the system controller 400 may be substantially the same.

The frame layout information generator 500 may generate frame layout information regarding the layout of an initial transmission frame according to the needs of a service provider, a DAS user, or the like, or by reconfiguring the layout of a predetermined transmission frame.

For example, the frame layout information generator 500 may generate frame layout information defining an initial structure of a transmission frame in response to a request of a service provider or the like at an initial facility stage of the DAS.

For another example, the frame layout information generator 500 may generate frame layout information in which the structure of a predetermined transmission frame is changed according to the request of a service provider when the demand for some of bands being served in a facility area of the DAS is lowered and the service is to be stopped or when a new band is added for the service.

For another example, the frame layout information generator 500 may generate frame layout information in which the structure of a predetermined transmission frame is changed based on the request of a service provider or a self-analysis result when the actual operating environment of the DAS is monitored through the system controller 400, and it is determined that the provision of specific service bands is unnecessary for a long time.

As such, the DAS 10 according to embodiments may pseudo-dynamically change a frame structure to implement digital transmission of radio signals, thereby effectively using limited resources. This will be described in more detail with reference to the drawings later below.

In FIG. 1, the frame layout information generator 500 is illustrated as a separate configuration from the system controller 400, but is not limited thereto. The frame layout information generator 500 may be included in the system controller 400 or may be implemented independently of the system controller 400 and may be integrated with the system controller 400.

Figure 2:
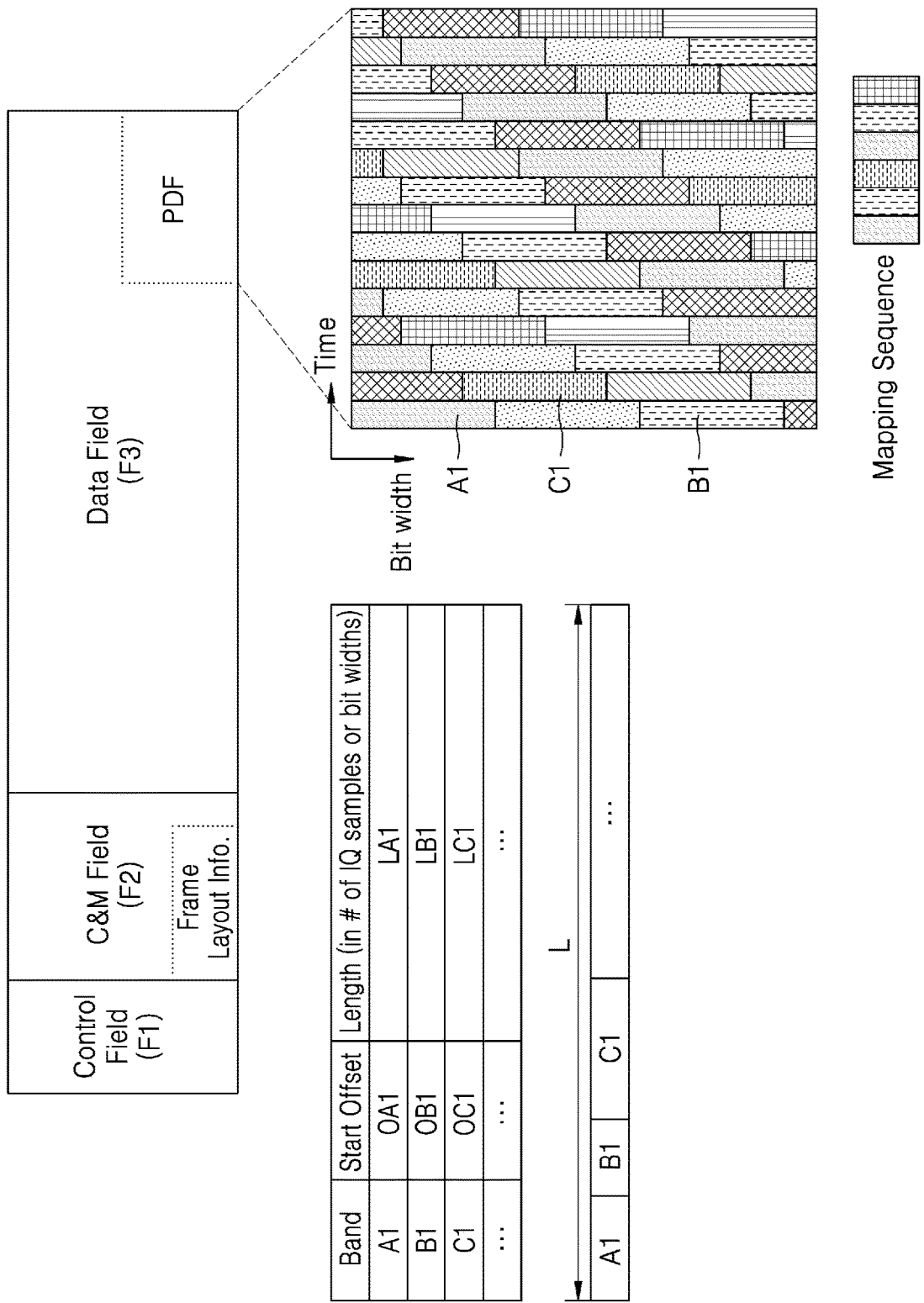
FIG. 2 is an exemplary view of a structure of a transmission frame used in the distributed antenna system of FIG. 1.

FIG. 2 is an exemplary view of a structure of a transmission frame used in the distributed antenna system of FIG. 1.

Referring to FIG. 2, the transmission frame may be a frame for data transmitted between the headend unit 100, the expansion unit 200, and the remote units 300-1 to 300-8 of the DAS 10.

The transmission frame may include a control field F1, a C&M field F2, and a data field F3.

The control field F1 may be a portion for controlling a connection device and transmitting information. The control field F1 may be a portion used for linking, time synchronization information transmission, a reset request, link reception quality transmission, redundancy status transmission, and the like of the connection device.

According to an embodiment, the control field F1 may be a concept including a portion related to vendor specific information. The vendor specific information is information that may be additionally set by a system administrator and may include information for identifying information of a vendor.

The C&M field F2 may be a portion used for monitoring and controlling the headend unit 100, the expansion unit 200, and the remote units 300-1 to 300-8. Alternatively, the C&M field F2 may be used to perform software upgrade of the headend unit 100, the expansion unit 200, and the remote units 300-1 to 300-8.

Network control information and performance monitoring information may be transmitted together with a predetermined control signal through the C&M field F2.

In some embodiments, frame layout information may be transmitted through the C&M field F2. The frame layout information is not transmitted every cycle. The frame layout information may be transmitted through the C&M field F2 when an initial setting or a change of a frame layout is required due to a change in the operating environment or the like during initial installation of the DAS 10. The frame layout information may be transmitted through the C&M field F2 under the control of the system controller 400 (and the frame layout information generator 500).

The frame layout information may include a start point offset and a length value of data streams (or I/Q data streams) corresponding to radio signals from the sources Sa to Sc. For example, the frame layout information may include a start point offset OA1 and a length LA1 of first data streams corresponding to band A1 among radio signals, a start point offset OB1 and a length LB1 of second data streams corresponding to band B1 among the radio signals, and a start point offset OC1 and a length LC1 of third data streams corresponding to band C1. The frame layout information may include a start point offset and a length value of Ethernet data from the source Sd. According to the start point offset and the length of each of the data streams included in the frame layout information, each of the data streams may be mapped to resource blocks of the data field F3 described later below.

The data field F3 may be a portion including actual data to be transmitted. For example, the data field F3 may include data streams for radio signals from the sources Sa to Sc. Alternatively, the data field F3 may include Ethernet data from the source Sd.

As illustrated by enlarging a portion PDF of the data field F3, the data streams may be sequentially mapped to the resource blocks, respectively, in a predetermined mapping sequence. For example, the first data stream, the second data stream, and the third data stream are mapped to resource blocks A1, B1, and C1, respectively. A case in which a frame layout is changed will be described in more detail with reference to FIG. 5 below.

Figure 3:
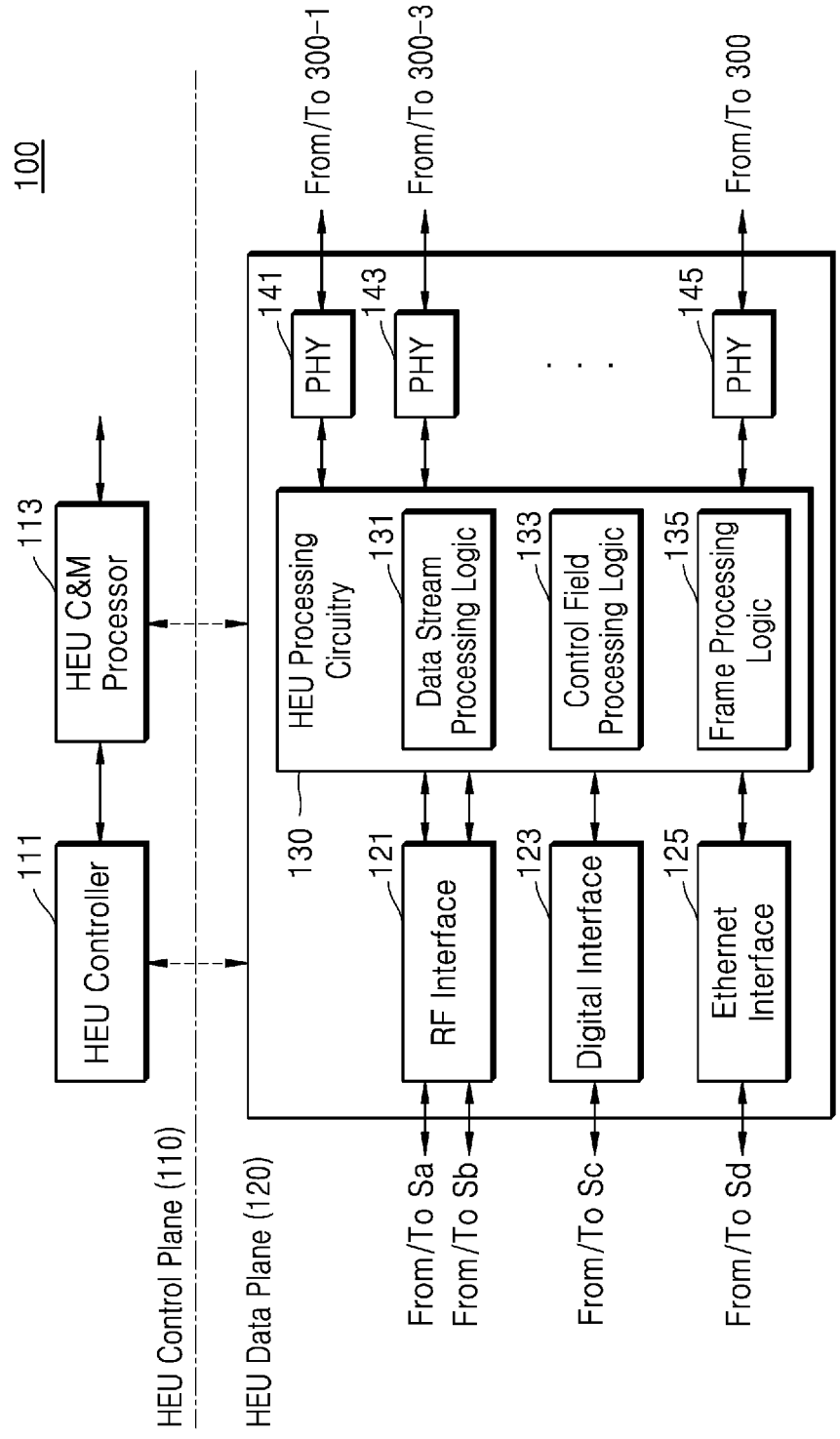
FIG. 3 is an exemplary block diagram for describing a headend unit of FIG. 1 in more detail.

FIG. 3 is an exemplary block diagram for describing the headend unit 100 of FIG. 1 in more detail.

Referring to FIG. 3, the headend unit 100 may include an HEU control plane 110 and an HEU data plane 120.

The HEU control plane 110 may process control information required to process a signal input to the headend unit 100 and transmit the signal to other units. In addition, the HEU control plane 110 may receive information necessary to change the structure of a transmission frame required for transmission of signals from the system controller 400, and may transmit the information to other lower units.

The HEU control plane 110 may include an HEU controller 111 and an HEU C&M processor 113.

The HEU controller 111 may process various operations related to the overall operation of the headend unit 100, and may execute instructions related to the function of the headend unit 100. For example, the HEU controller 111 may be a central processing unit (CPU).

The HEU C&M processor 113 is a component for transmitting and receiving C&M data such as status monitoring and control information with other units and the system controller 400. For example, the HEU C&M processor 113 may be an Ethernet switch. The HEU C&M processor 113 may be communicatively coupled to the controller 111, and may be controlled whether the C&M data is processed under the control of the controller 111.

Figure 8:
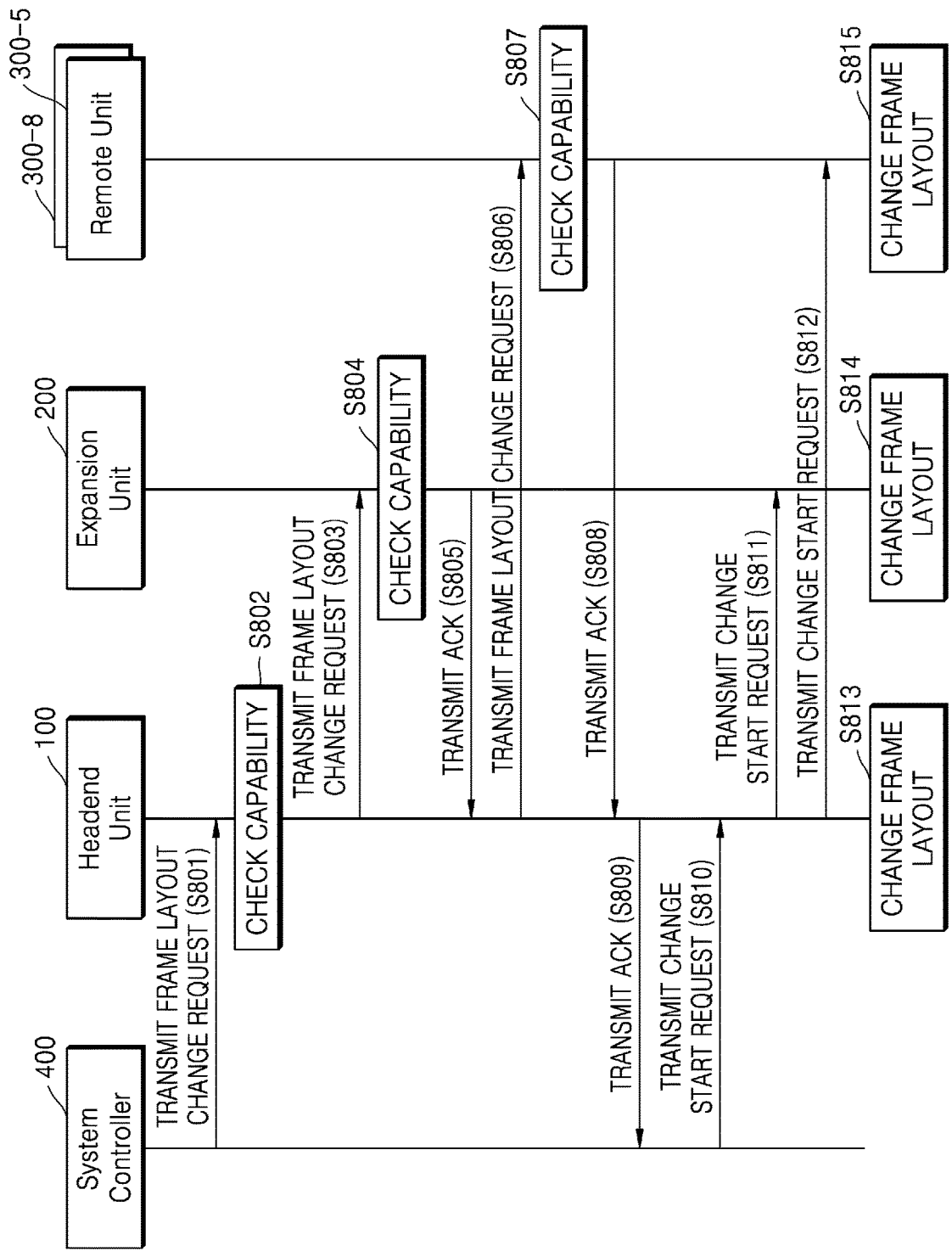
FIGS. 8 and 9 are flowcharts for describing a reconfiguration operation of a frame structure of the distributed antenna system of FIG. 1.
Figure 9:
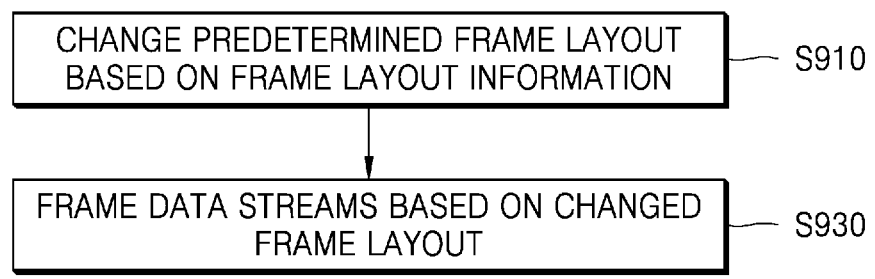

The controller 111 and the HEU C&M processor 113 of the HEU control plane 110 may perform handshaking (see FIG. 8) for initiating a frame structure change operation, and may control a frame structure change operation of the HEU data plane 120 (see FIG. 9).

The HEU data plane 120 may perform a forwarding function through interfacing, digitization, framing and/or routing of signals input to the headend unit 100.

The HEU data plane 120 may include an RF interface 121, a digital interface 123, an Ethernet interface 125, HEU processing circuitry 130, and a plurality of PHYs 141, 143, and 145.

The RF interface 121 may receive RF signals from the sources Sa and Sb and digitally convert the same, and may output data streams generated as a result of the digital conversion to the HEU processing circuitry 130.

The RF interface 121 may analogize uplink signals and transmit them to the sources Sa and Sb.

The RF interface 121 may include an analog-to-digital converter (ADC) and a digital-to-analog converter (DAC) for RF-to-digital conversion processing for each of the sources Sa and Sb. Meanwhile, the RF interface 121 may be implemented as unit modules for each band of RF signals.

The digital interface 123 may receive digitized RF signals from the source Sc. The digitized RF signals may include a data packet formatted according to a standardized telecommunication protocol such as CPRI, OBSAI, and the like. In this case, in order to reduce high overheads of the CPRI and OBSAI, the digital interface 123 may include a resampler for adjusting a sampling rate. The digital interface 123 may output data streams to the processing circuit 130 after processing such as resampling of the digitized RF signals. In this case, the digitized RF signals may be digitized RF signals transmitted over Ethernet as defined in Ethernet based Common Public Radio Interface (eCPRI) and IEEE 1914. In this case, the digital interface 123 may include a converting module for format conversion.

The digital interface 123 may process uplink data streams output from the processing circuit 130 to conform to the original format and then transmit the uplink data streams to the source Sc.

Meanwhile, the digital interface 123 may interface with a centralized radio access network (C-RAN), a radio access exchange (RAX), an integrated BTS (all-in-one BTS), or the like to receive the digitized RF signals.

The Ethernet interface 125 may transmit and receive Ethernet data for the backhaul service from the source Sd. For example, the Ethernet interface 125 may be an Ethernet router, an Ethernet switch, or the like.

The HEU processing circuitry 130 may perform processing for forwarding data streams received from the RF interface 121, the digital interface 123, and the Ethernet interface 125 to other units based on a downlink path.

The HEU processing circuitry 130 may perform processing for forwarding data streams received from the plurality of PHYs 141 to 145 to the sources Sa to Sd based on an uplink path.

The HEU processing circuitry 130 may include a data stream processing logic circuit 131, a control field processing logic circuit 133, and a frame processing logic circuit 135.

The data stream processing logic circuit 131 may perform resampling, aggregation processing, and the like on data streams based on the downlink path. The data stream processing logic circuit 131 may output the processed data streams to the frame processing logic circuit 135.

The data stream processing logic circuit 131 may perform summation on data streams output from the frame processing logic circuit 135 based on the uplink path, and may transmit the processed data streams to the RF interface 121 or the like.

The control field processing logic circuit 133 may generate and process time synchronization information, a reset request, link reception quality information, and the like, and output the same to the frame processing logic circuit 135, and may process information received from another unit output from the frame processing logic circuit 135 and output the processed information to the controller 111.

Hereinafter, the frame processing logic circuit 135 will be described with reference to FIGS. 4 and 5.

Figure 4:
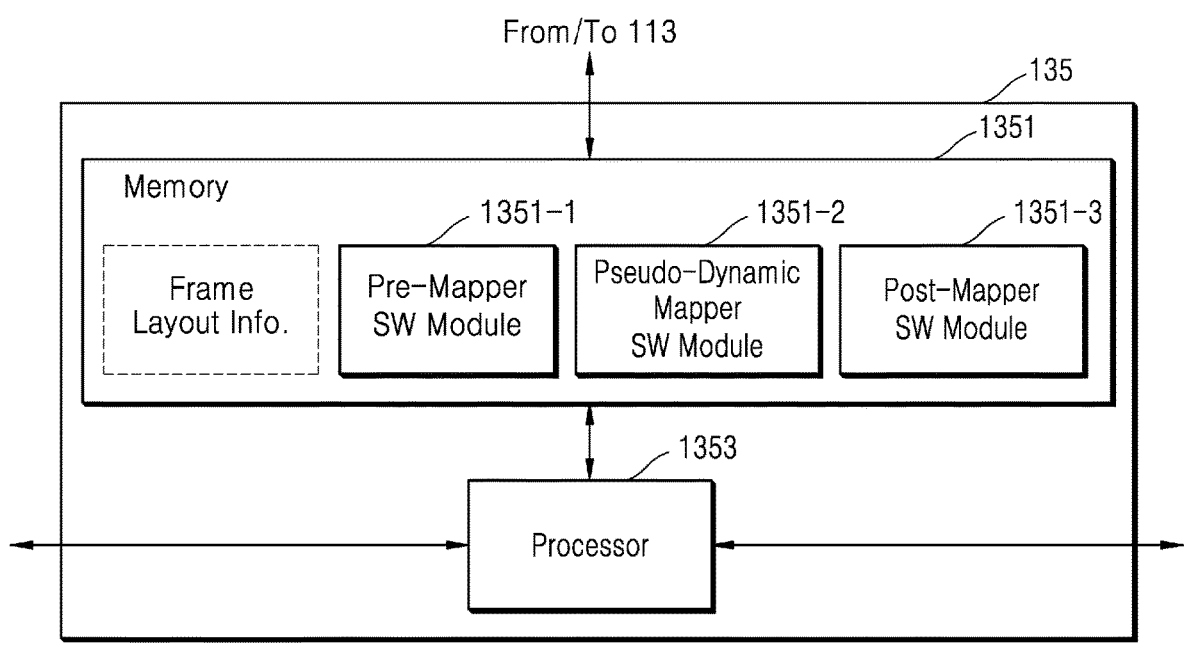
FIGS. 4 and 5 are exemplary views for describing a frame processing logic circuit of FIG. 3 in more detail.

First, referring further to FIG. 4, the frame processing logic circuit 135 may frame data streams received from the data stream processing logic circuit 131 and control information received from the control field processing logic circuit 133 or deframe transmission frames received from the PHYs 141 to 145, and may transmit the data streams and the control information to the data stream processing logic circuit 131 and the control field processing logic circuit 133, respectively.

The frame processing logic circuit 135 may include a memory 1351 and a processor 1353.

The memory 1351 may include a non-transitory computer-readable medium (e.g., one or more non-volatile memory elements such as EPROM, EEPROM, flash memory, hard drive, etc.) capable of storing at least the following software (SW) modules.

The memory 1351 may include a pre-mapper software module 1351-1 that enables buffering of input data streams and aggregation and scheduling of the buffered data streams based on a downlink path, and output of deframed data streams to various ports based on an uplink path.

The memory 1351 may include a pseudo-dynamic mapper software module 1351-2 that enables data streams collected based on the downlink path to be framed according to a reconfigurable transmission frame structure and enables the data streams to be deframed based on the uplink path.

The memory 1351 may include a post-mapper software module 1351-3 that enables at least one of scrambling, encoding, and serialization on data framed based on the downlink path and enables at least one of parallelism, decoding, and descrambling based on the uplink path.

Meanwhile, the memory 1351 may store frame layout information received from the system controller 400.

Each of the software modules, when being executed by the processor 1353, includes instructions that cause the frame processing logic circuit 135 to perform corresponding functions. Thus, the non-transitory computer-readable medium of the memory 1351 includes instructions for performing some or all of the above-described operations.

The processor 1353 may be one or more suitable processors capable of executing instructions or scripts of one or more software programs stored in the memory 1351.

Next, a framing process of the frame processing logic circuit 135 will be described in more detail with reference to FIG. 5.

The frame processing logic circuit 135 frames input data streams according to a layout of a predetermined transmission frame (or an initial transmission frame).

As described above with reference to FIG. 2, a data field in the initially set transmission frame has a layout in which frequency band data streams, in the DAS 10, are sequentially mapped to resource blocks in a predetermined mapping sequence.

In the initially set transmission frame, the mapping sequence pre-defines the mapping sequence for the resource blocks on the assumption that all data streams for each frequency band that the DAS 10 may support are mapped to the resource blocks. In addition, the mapping sequence has a fixed value for the purpose of improving data processing speed and reducing computational complexity.

However, even if all frequency bands are not serviced in the DAS 10, the fixing of the mapping sequence causes a mapping position of data streams of a service frequency band to be fixed to spaced resource blocks, thereby causing a problem that pre-allocated resource blocks for a non-service frequency band are wasted.

Figure 5:
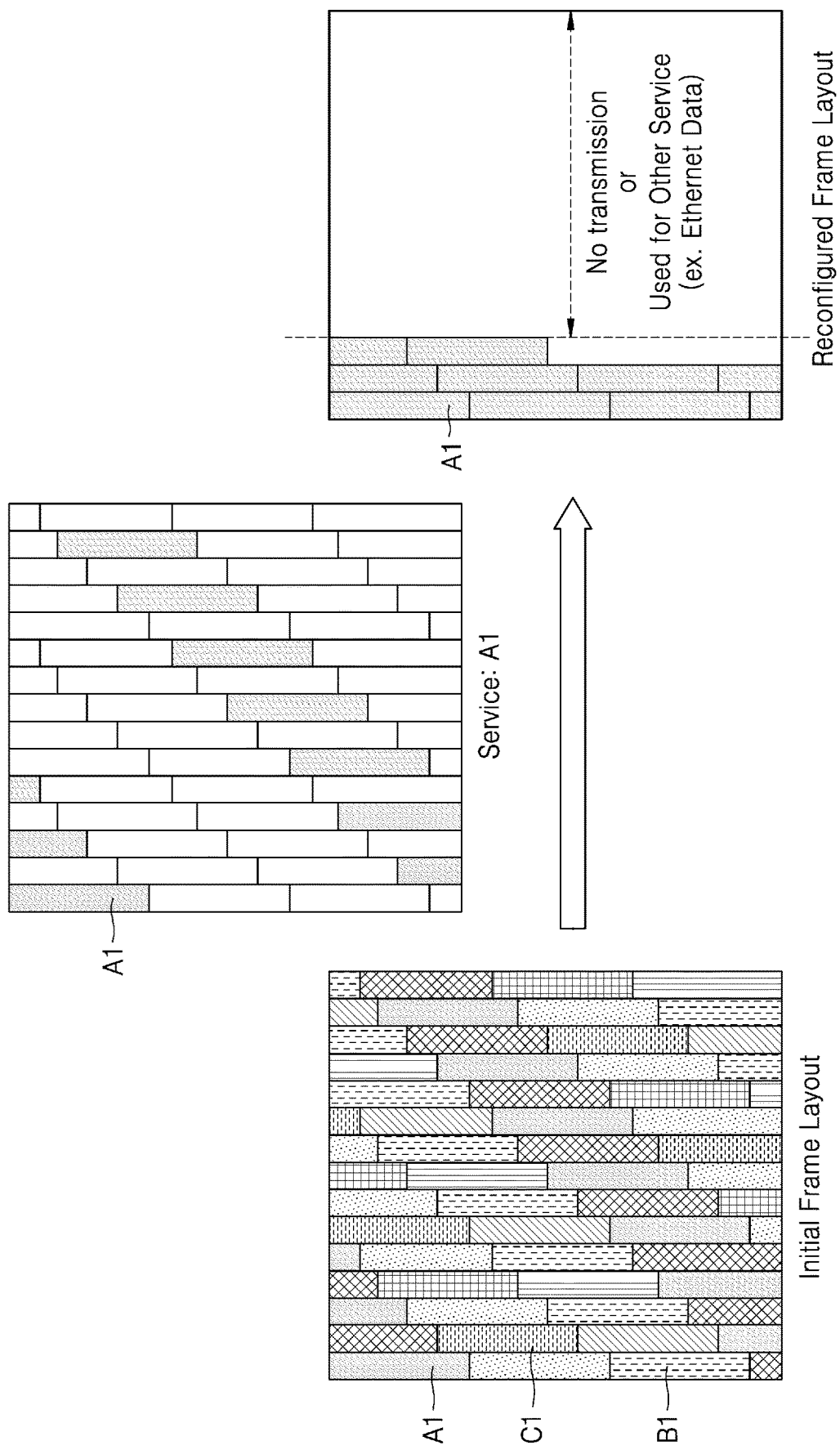

For example, as shown in FIG. 5, when the DAS 10 provides a service only to the frequency band A1, data streams corresponding to the frequency band A1 are mapped to resource blocks distributed far from each other due to the fixed mapping sequence. As a result, the resource blocks for the non-service frequency band are transmitted in an empty state (or with filled bit sequences indicating not to use the corresponding resource block).

In order to solve this problem, the DAS 10 according to embodiments does not use a frame layout of a transmission frame fixedly, but changes the frame layout according to the operating environment of the DAS 10.

Based on the changed frame layout, the frame processing logic circuit 135 frames data streams into a transmission frame having a changed frame layout.

For example, as shown in FIG. 5, when only the frequency band A1 is serviced by the DAS 10, the frame layout information generator 500 generates information about a frame layout in which a mapping position of data streams corresponding to the frequency band A1 is changed.

The generated frame layout information may be information obtained by changing the mapping position of the data streams such that the data streams corresponding to the frequency band A1 are mapped to contiguous resource blocks. In the generated frame layout information, the mapping position may be changed by changing the mapping sequence. The contiguous resource blocks may be contiguous in a time domain. Further, resource blocks to which data streams are not allocated (unallocated resource blocks) are not interposed between the contiguous resource blocks, and all resource blocks may be adjacent to each other.

The frame processing logic circuit 135 reconfigures a predetermined initial frame layout based on the generated frame layout information, and frames data streams based on the reconfigured frame layout.

According to the embodiments, unlike the general DAS that uses a fixed frame structure, limited transmission resources may be efficiently used.

In addition, according to the embodiments, unallocated resource blocks may not be framed and transmitted, thereby reducing power consumption and improving the quality of service by lowering a bit error rate (BER).

Further, according to the embodiments, the unallocated resource blocks may be used as resources for Ethernet data or other heterogeneous services for a backhaul service, thereby facilitating integrating heterogeneous services through the DAS 10 even under limited resources.

Referring again to FIG. 3, the headend unit 100 may include the plurality of PHYs 141, 143, and 145.

The PHYs 141, 143, and 145 may convert transmission frames output from the processing circuit 130 according to a transmission medium, and may transmit the converted transmission frames to the expansion unit 200 and the remote units 300-1 and 300-3 connected through the transmission medium.

Figure 6:
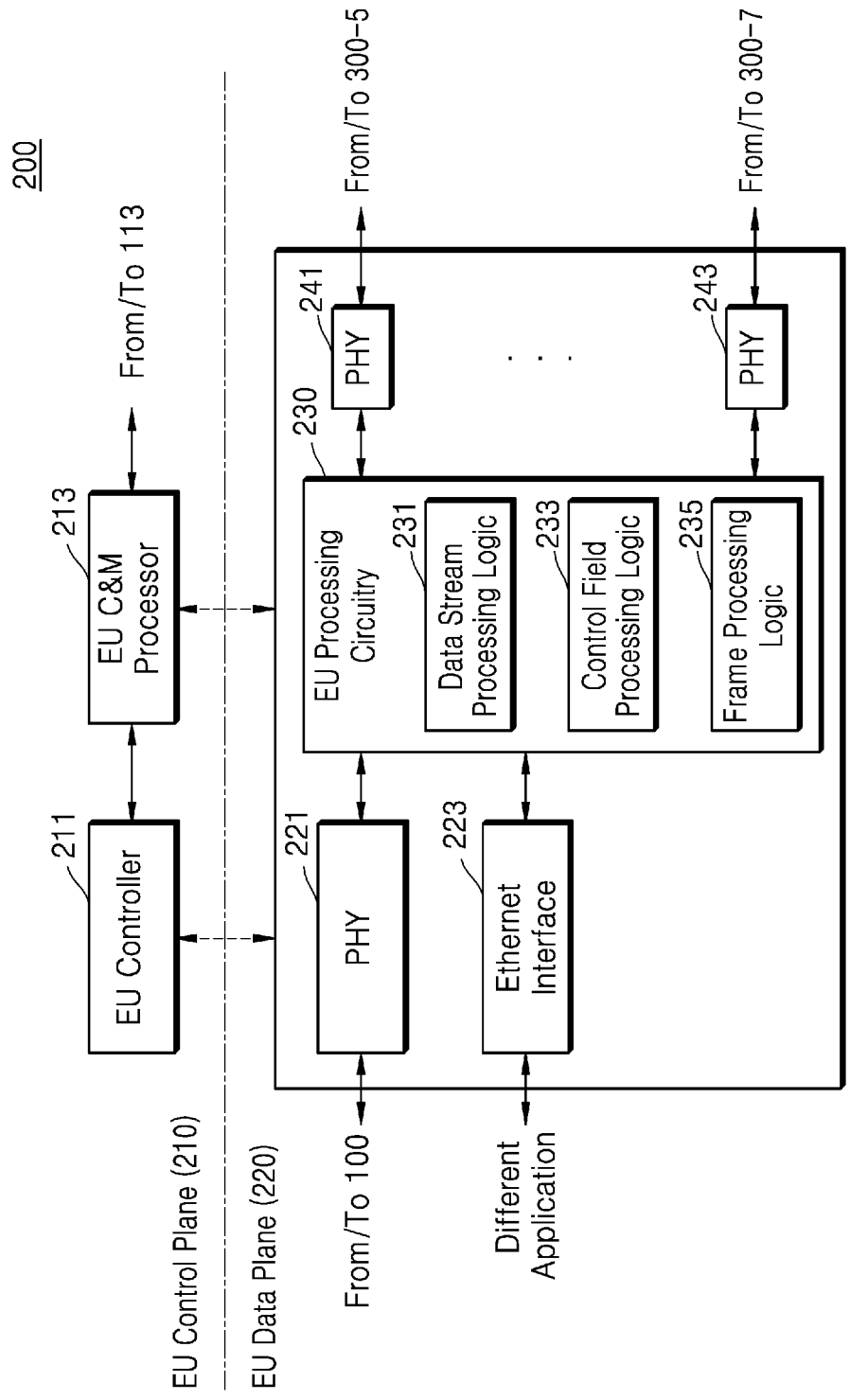
FIG. 6 is an exemplary block diagram for describing an expansion unit of FIG. 1 in more detail.

FIG. 6 is an exemplary block diagram for describing the expansion unit 200 of FIG. 1 in more detail.

Referring to FIGS. 1 and 6, the expansion unit 200 may include an EU control plane 210 and an EU data plane 220. Components included in each of the EU control plane 210 and the EU data plane 220 may perform substantially the same or similar functions as those of the components having the same names in the headend unit 100 of FIG. 3.

However, unlike the HEU data plane 120 of FIG. 3, the EU data plane 220 may not include the RF interface 121 and the digital interface 123. This is because the expansion unit 200 transmits a transmission frame between the headend unit 100 and the remote units 300-5 to 300-8 without directly receiving an RF signal or a digitized RF signal. To this end, the expansion unit 200 may include a PHY 221 for connection with the headend unit 100 and the transmission of the transmission frame.

Meanwhile, since the expansion unit 200 may be connected to a heterogeneous application device for an Ethernet service, the expansion unit 200 may include an Ethernet interface 223. For example, the heterogeneous application device may be small cell equipment, a Wi-Fi AP, or the like.

Figure 7:
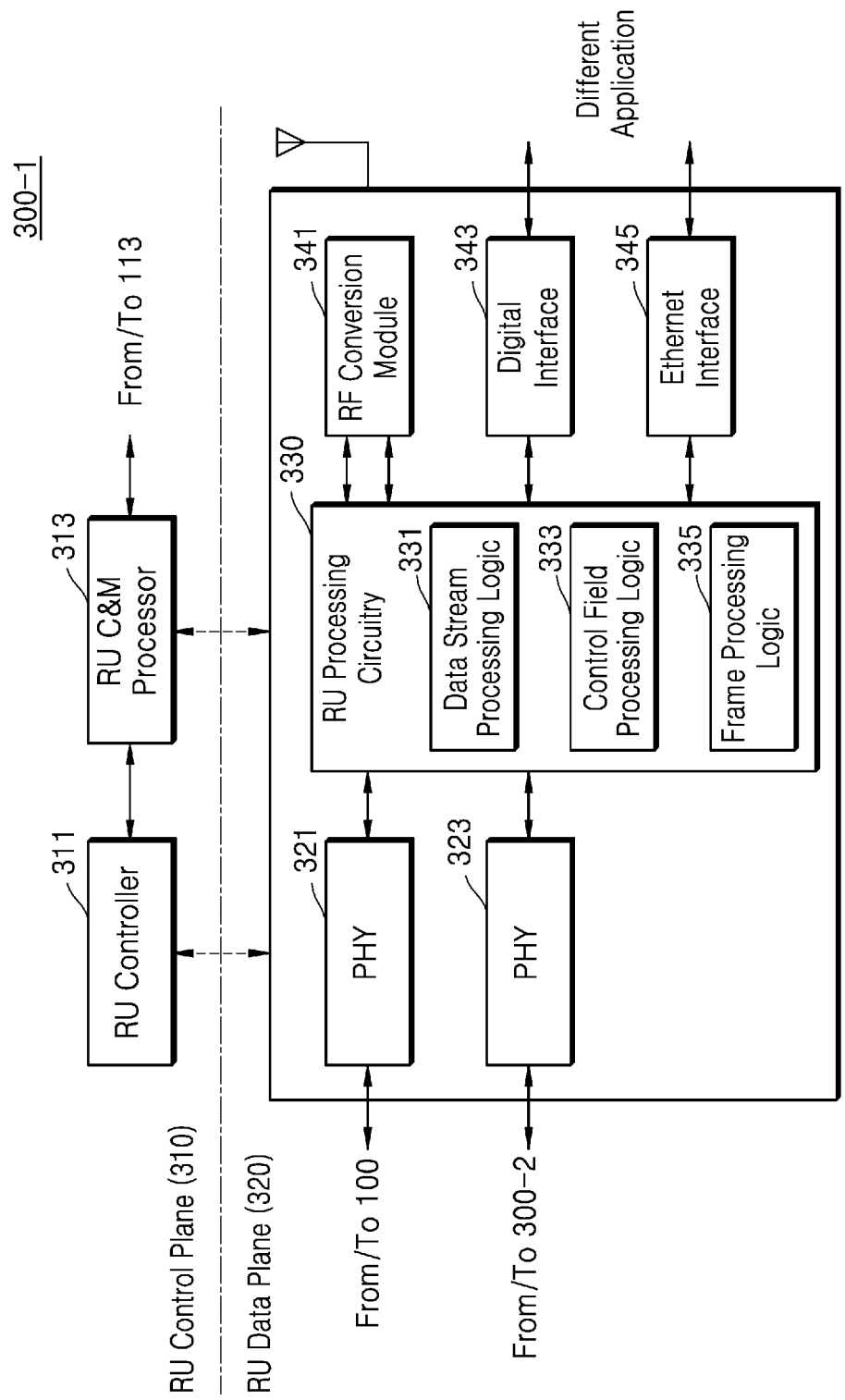
FIG. 7 is an exemplary block diagram for describing a remote unit of FIG. 1 in more detail.

FIG. 7 is an exemplary block diagram for describing the remote unit 300-1 of FIG. 1 in more detail.

Referring to FIG. 7, the headend unit 300-1 may include an RU control plane 310 and an RU data plane 320.

Components included in each of the EU control plane 210 and the EU data plane 220 may perform substantially the same or similar functions as those of the components having the same names of FIG. 3.

Similar to the HEU data plane 120 of the headend unit 100 of FIG. 3, the RU data plane 320 may include a digital interface 343 and an Ethernet interface 345. Base station devices may be connected to each other through the digital interface 343, and thus the DAS 10 may serve as an extension device among the base station devices. In addition, the Ethernet interface 345 may provide an Ethernet service to heterogeneous application devices, for example, a small cell, a Wi-Fi AP, or the like.

The RU data plane 320 may include a PHY 321 for a communicative connection with the headend unit 100, and a PHY 323 for a communicative connection with another remote unit 300-2.

The RU data plane 320 may include an RF conversion module 341 for transmitting and receiving an RF signal or a digitized RF signal due to the characteristics of the remote unit 300-1 that provides services to subscriber devices in coverage. The RF conversion module 341 may include an analog to digital converter (ADC), a digital to analog converter (DAC), an amplifier, and the like. In addition, although FIG. 7 illustrates the RF conversion module 341 as one module, the present disclosure is not limited thereto, and may include modules for each frequency band.

Meanwhile, although the remote unit 300-1 is exemplarily illustrated in FIG. 7, the other remote units 300-2 to 300-8 may also be implemented to have substantially the same structure and function as the remote unit 300-1.

FIGS. 8 and 9 are flowcharts for describing a reconfiguration operation of a frame structure of the distributed antenna system of FIG. 1.

FIG. 8 is a flowchart for describing a handshaking procedure for initiating a change of a frame structure in the DAS 10, and FIG. 9 is a flowchart for describing a frame structure changing procedure in each unit after completion of the handshaking procedure. In the description of FIGS. 8 and 9, the same or corresponding reference numerals as those in FIGS. 1 to 7 denote the same or corresponding elements, and therefore, repeated descriptions thereof will not be given herein and only differences will be mainly described.

First, referring to FIG. 8, in operation S801, the system controller 400 transmits a frame layout change request message to the headend unit 100 according to new frame layout information and a change request received from the frame layout information generator 500. The frame layout change request message may include new frame layout information. The frame layout information generator 500 may generate the new frame layout information according to a request of a service provider or a DAS user.

In operation S802, the headend unit 100 determines whether to change a frame in response to the received frame layout change request message. The headend unit 100 may check the integrity of a new frame layout, a use state of transmission resources, and the change in resource usage according to the new frame layout, and may determine whether to change a frame structure based on a result of the checking.

In operation S803, the headend unit 100 transmits the received frame layout change request message to the expansion unit 200.

In operation S804, the expansion unit 200 may check an operation state or the like similarly to the headend unit 100, and may determine whether to change the frame structure based on a result of the checking.

In operation S805, the expansion unit 200 transmits a confirmation message to the headend unit 100 if the determination result is a change in the frame structure.

In operation S806, the headend unit 100 transmits the received frame layout change request message to the remote units 300-5 to 300-8.

In operation S807, the remote units 300-5 to 300-8 may check an operation state or the like similarly to the headend unit 100 and the expansion unit 200, and may determine whether to change the frame structure based on a result of the checking.

In operation S808, the remote units 300-5 to 300-8 transmit a confirmation message to the headend unit 100 if the determination result is a change in the frame structure.

In operation S809, when receiving the confirmation message from the expansion unit 200 and the remote units 300-5 to 300-8, the headend unit 100 transmits the confirmation message to the system controller 400. Accordingly, the system controller 400 may recognize that a frame change procedure start condition of all units of the DAS 10 is completed.

In operation S810, the system controller 400 transmits a frame layout change start request message to the headend unit 100 in response to the confirmation message received from the headend unit 100.

In operation S811 and operation S812, the headend unit 100 may transmit a frame layout change start message to the expansion unit 200 and the remote units 300-5 to 300-8, respectively.

In operation S813, operation S814, and operation S815, each of the headend unit 100, the expansion unit 200, and the remote units 300-5 to 300-8 may start a frame layout change procedure based on the frame layout change start message.

Further referring to FIG. 9, in operation S910, each of the headend unit 100, the expansion unit 200, and the remote units 300-5 to 300-8 changes a predetermined frame layout based on the new frame layout information.

In operation S930, each of the headend unit 100, the expansion unit 200, the remote units 300-5 to 300-8 frames data streams based on the changed frame layout.

As described above, according to embodiments, when service providers or DAS users requests a frame layout change, it is possible to secure the continuity and stability of service by changing a frame layout after provisioning for comprehensively determining a service state of a DAS without changing the frame layout immediately.

In FIG. 8 and FIG. 9, the procedures assume the frame layout change procedure, but are not limited thereto. The above-described procedures may be substantially applied in initial setting of the frame layout.

Although not specified in FIGS. 8 and 9, the procedures illustrated in FIGS. 8 and 9 may be separately performed when structures of a downlink transmission frame and an uplink transmission frame are changed. However, the present disclosure is not limited thereto, and a structure change procedure of the downlink transmission frame and the uplink transmission frame may be performed at the same time.

The term "determine" includes a wide variety of actions. For example, the term "determine" may include computing, processing, deriving, examining, looking up (e.g., looking up in a table, database, or other data structure), identifying, and the like. The term "determine" may also include receiving (e.g., receiving information), accessing (accessing data in a memory), and the like. The term "determine" may also include resolving, selecting, choosing, establishing, and the like.

Further, the methods described with reference to FIGS. 8 and 9 include one or more operations or actions for achieving the methods. The operations and/or actions for achieving the methods may be interchanged with one another without departing from the scope of the claims. In other words, the order and/or use of specific operations and/or actions may be modified without departing from the scope of the claims, unless a certain order for the operations and/or actions is specified.

In addition, various operations of the methods described above may be performed by any suitable means capable of performing corresponding functions. The means includes, but is not limited to, various hardware and/or software components and/or modules such as an application specific integrated circuit (ASIC) or a processor. In general, when there are operations corresponding to the drawings, these operations may have a corresponding counterpart and functional components having the same number as the number of the counterpart.

Figure 10:
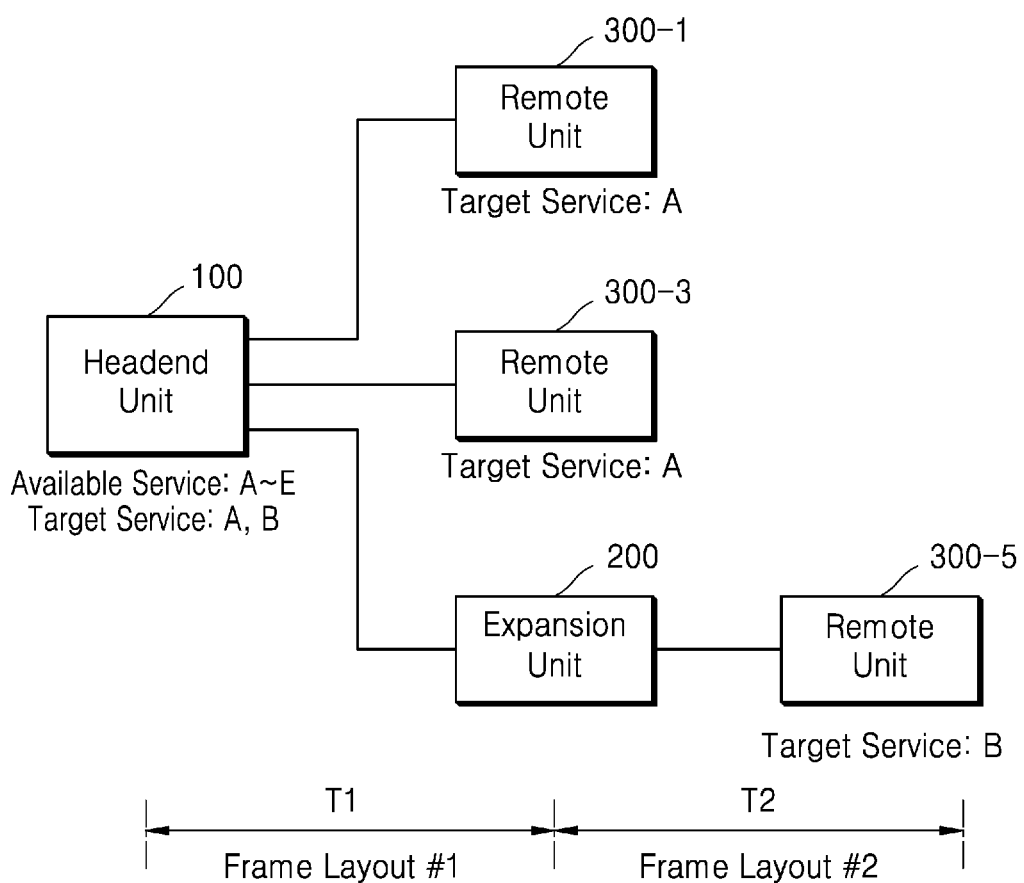
FIGS. 10 to 12 are views for describing an application form of a variable operation of a frame structure according to embodiments.
Figure 11:
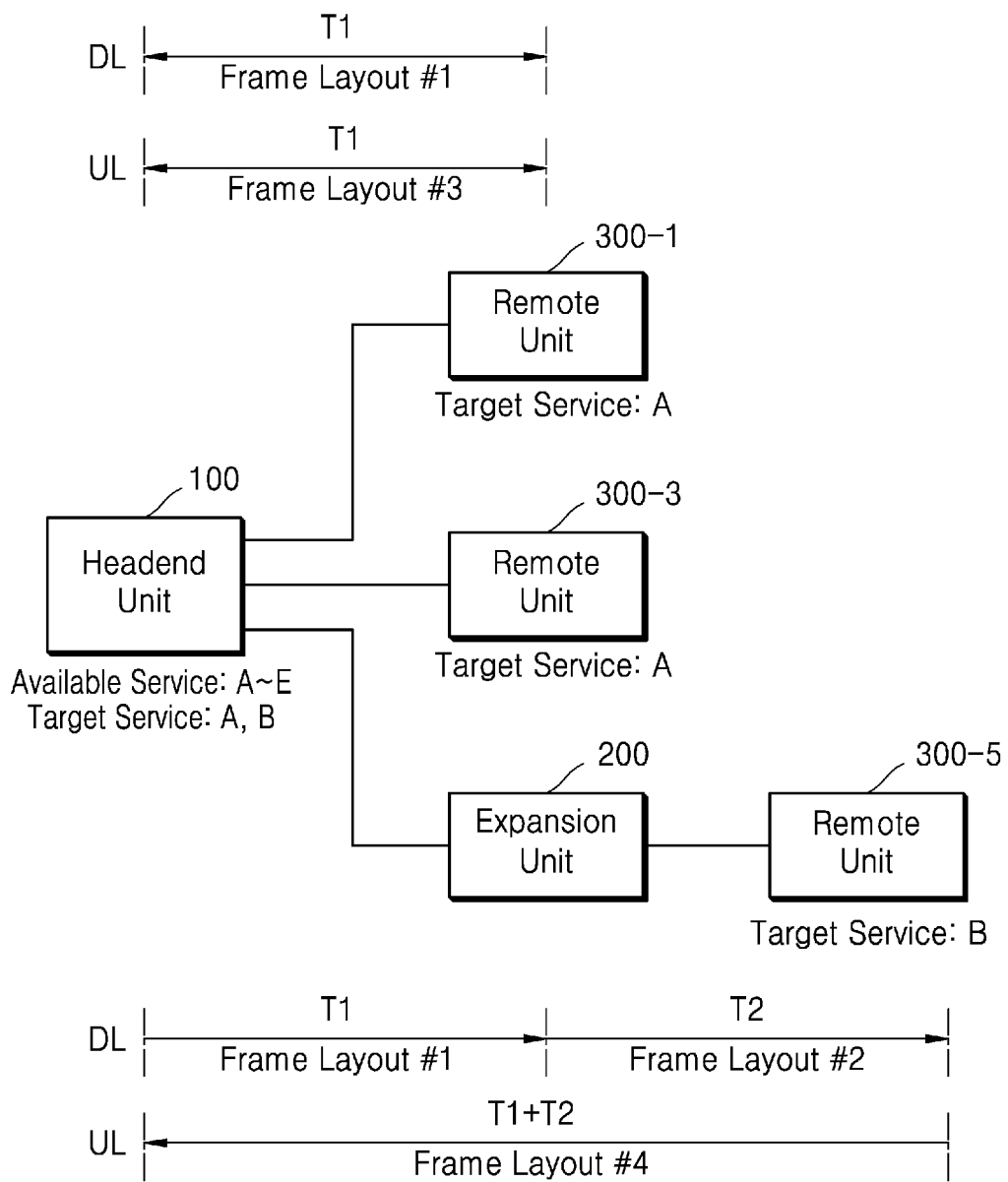
Figure 12:
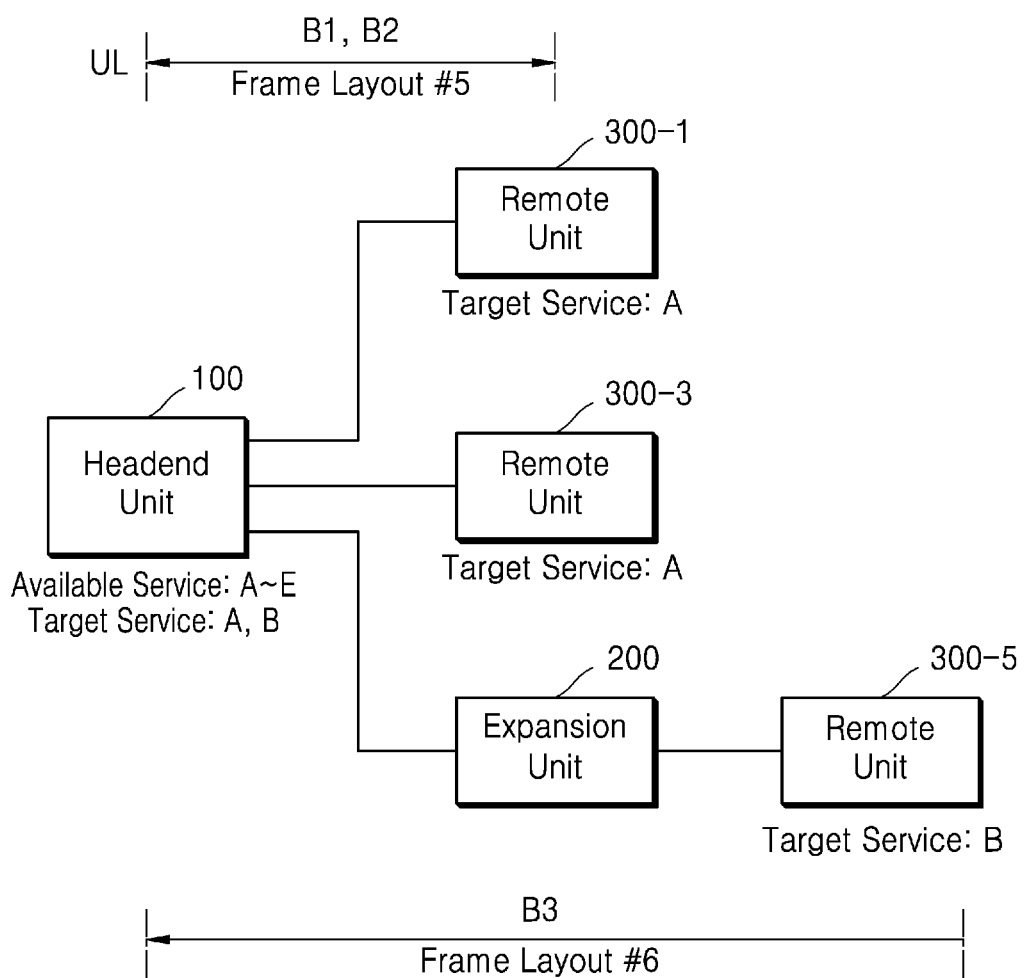

FIGS. 10 to 12 are views for describing an application form of a variable operation of a frame structure according to embodiments.

FIG. 10 is a view for describing a variable operation example of a frame layout for each transmission period in a distributed antenna system, and FIG. 11 is a view for describing a variable operation example of a frame layout for each of an uplink and a downlink in the distributed antenna system. FIG. 12 is a view for describing an example of variable operation of a frame layout for each branch (routing path) in the distributed antenna system.

In FIGS. 10 to 12, each embodiment will be described on the assumption of an operating environment in which although frequency bands that the distributed antenna system may provide are A to E, actual service frequency bands are frequency band A serviced by the remote units 300-1 and 300-3 and frequency band B serviced by the remote unit 300-5.

First, referring to FIG. 10, a layout of an identical initial transmission frame may be changed to different layouts in a transmission period T1 between the expansion unit 200 and the remote units 300-1 and 300-3 directly connected to the headend unit 100, and a transmission period T2 between the expansion unit 200 and the remote unit 300-5.

Due to aggregation, duplication, and distribution functions of the service frequency bands of the headend unit 100, only resource blocks for the frequency bands A and B are required in the transmission period T1. Accordingly, in the transmission period T1, the layout of the initial transmission frame may be changed such that only the frequency bands A and B are mapped to contiguous resource blocks (Frame Layout #1).

Meanwhile, since only resource blocks for the frequency band B are required in the transmission period T2, the layout of the initial transmission frame may be changed such that only the frequency band B is mapped to the contiguous resource blocks (Frame Layout #2).

As described above, in an operating environment in which a transmission target frequency band is different for each level of transmission topology, a different frame layout may be applied between the levels of the transmission topology, that is, for each transmission period.

Referring to FIG. 11, only resource blocks for the frequency band A are required in an uplink path from the remote units 300-1 and 300-3 to the headend unit 100. Accordingly, in the transmission period T1 between the headend unit 100 and the remote units 300-1 and 300-2, the layout of the initial transmission frame may be changed to allocate only the resource blocks for the frequency A to a transmission frame of the uplink path (Frame Layout #3).

Meanwhile, only resource blocks for the frequency band B are required in an uplink path from the remote unit 300-5 to the expansion unit 200 and the headend unit 100. Accordingly, in the transmission periods T1 and T2 between the headend unit 100, the expansion unit 200, and the remote unit 300-6, the layout of the initial transmission frame may be changed to allocate only the resource blocks for the frequency B to the transmission frames of the uplink path (Frame Layout #4).

As such, the distributed antenna system may be operated by applying a different frame layout according to a service state of each of the downlink path and the uplink path.

Referring to FIG. 12, when the headend unit 100 is capable of selective collection of service frequency bands, in the transmission period T1 of FIG. 10, a different frame layout may also be applied between the headend unit 100 and the remote units 300-1 and 300-3 and between the headend unit 100 and the expansion unit 200.

Accordingly, the layout of the initial transmission frame may be changed between the headend unit 100 and each of the remote units 300-1 and 300-3 such that only the frequency band A is mapped to the contiguous resource blocks (Frame Layout #5). In addition, the layout of the initial transmission frame may be changed between the headend unit 100, the expansion unit 200, and the remote unit 200-5 such that only the frequency band B is mapped to the contiguous resource blocks (Frame Layout #6).

As such, the distributed antenna system may operate by applying a different frame layout for each branch (routing path).

The various illustrative logic blocks, components, or circuits described in connection with the present disclosure may be implemented or performed by a general-purpose processor designed to perform the functions disclosed herein, a digital signal processor (DSP), an ASIC, a field-programmable gate array (FPGA) or other programmable logic device (PLD), a discrete gate or transistor logic device, discrete hardware components, or any combination thereof. The general-purpose processor may be a microprocessor, but in the alternative, the processor may be any commercially available processor, controller, microcontroller, or state machine. The processor may also be implemented in a combination of computing devices, for example, a combination of the DSP and the microprocessor, a plurality of microprocessors, one or more microprocessors in conjunction with a DSP core, or any other such configuration.

Numerous modifications and adaptations will be readily apparent to one of ordinary skill in the art without departing from the spirit and scope of the present disclosure.

In this regard, the present embodiments may have different forms and should not be construed as being limited to the descriptions set forth herein.

While the present disclosure has been particularly shown and described with reference to embodiments thereof, it will be understood that various changes in form and details may be made therein without departing from the scope of the following claims.

The invention claimed is:

1. A method of processing a data stream in a node unit included in a distributed antenna system, the method comprising:
    receiving frame layout information;
    changing a frame layout of a predetermined transmission frame based on the received frame layout information; and
    framing a plurality of data streams, which are associated with at least one frequency band from among a plurality of frequency bands supported by the distributed antenna system, based on the changed frame layout.

2. The method of claim 1, wherein the frame layout information is obtained by changing a predetermined mapping position of the plurality of data streams such that the plurality of data streams are mapped to contiguous resource blocks in a data field of the transmission frame.

3. The method of claim 2, wherein the contiguous resource blocks are contiguous in a time domain.

4. The method of claim 2, wherein resource blocks to which the plurality of data streams are not mapped are not interposed between the contiguous resource blocks.

5. The method of claim 1, wherein the frame layout information comprises frame layout information about each of transmission periods, and
the changing of the frame layout comprises:
changing the frame layout of the predetermined transmission frame with respect to a transmission period associated with the node unit among the transmission periods.

6. The method of claim 1, wherein the frame layout information comprises frame layout information about each of downlink path and uplink path, and
the changing of the frame layout comprises:
changing the frame layout of the predetermined transmission frame for each of the downlink path and the uplink path.

7. The method of claim 1, wherein the receiving of the frame layout information comprises:
receiving the frame layout information from a system controller of the distributed antenna system or another node unit communicatively coupled to the node unit.

8. A frame processing logic circuit included in a node unit of a distributed antenna system, the frame processing logic circuit comprising:
a memory storing one or more instructions; and
a processor executing the one or more instructions stored in the memory,
wherein the processor, by executing the one or more instructions, is configured to:
change a frame layout of a predetermined transmission frame based on received frame layout information, and
frame a plurality of data streams, which are associated with at least one frequency band from among a plurality of frequency bands supported by the distributed antenna system, based on the changed frame layout.

9. The frame processing logic circuit of claim 8, wherein the frame layout information is obtained by changing a predetermined mapping position of the plurality of data streams such that the plurality of data streams are mapped to contiguous resource blocks in a data field of the transmission frame.

10. The frame processing logic circuit of claim 9, wherein the contiguous resource blocks are contiguous in a time domain.

11. The frame processing logic circuit of claim 9, wherein resource blocks to which the plurality of data streams are not mapped are not interposed between the contiguous resource blocks.

12. The frame processing logic circuit of claim 8, wherein the frame layout information comprises frame layout information about each of transmission periods, and
the processor, by executing the one or more instructions, is configured to:
change the frame layout of the predetermined transmission frame with respect to a transmission period associated with the node unit among the transmission periods.

13. The frame processing logic circuit of claim 8, wherein the frame layout information comprises:
frame layout information about each of downlink path and uplink path, and
the processor, by executing the one or more instructions, is configured to:
change the frame layout of the predetermined transmission frame for each of the downlink path and the uplink path.

14. The frame processing logic circuit of claim 8, wherein the frame layout information is received from a system controller of the distributed antenna system or another node unit communicatively coupled to the node unit.

15. The frame processing logic circuit of claim 8, wherein the node unit is any one of a headend unit, an expansion unit, and a remote unit.

* * * * *